Feb. 16, 1971 M. G. LEONARD 3,564,386
POWER SUPPLY FOR CONVERTING HIGH VOLTAGE ALTERNATING
CURRENT INTO HIGH VOLTAGE DIRECT CURRENT
Filed Dec. 27, 1968 2 Sheets-Sheet 1
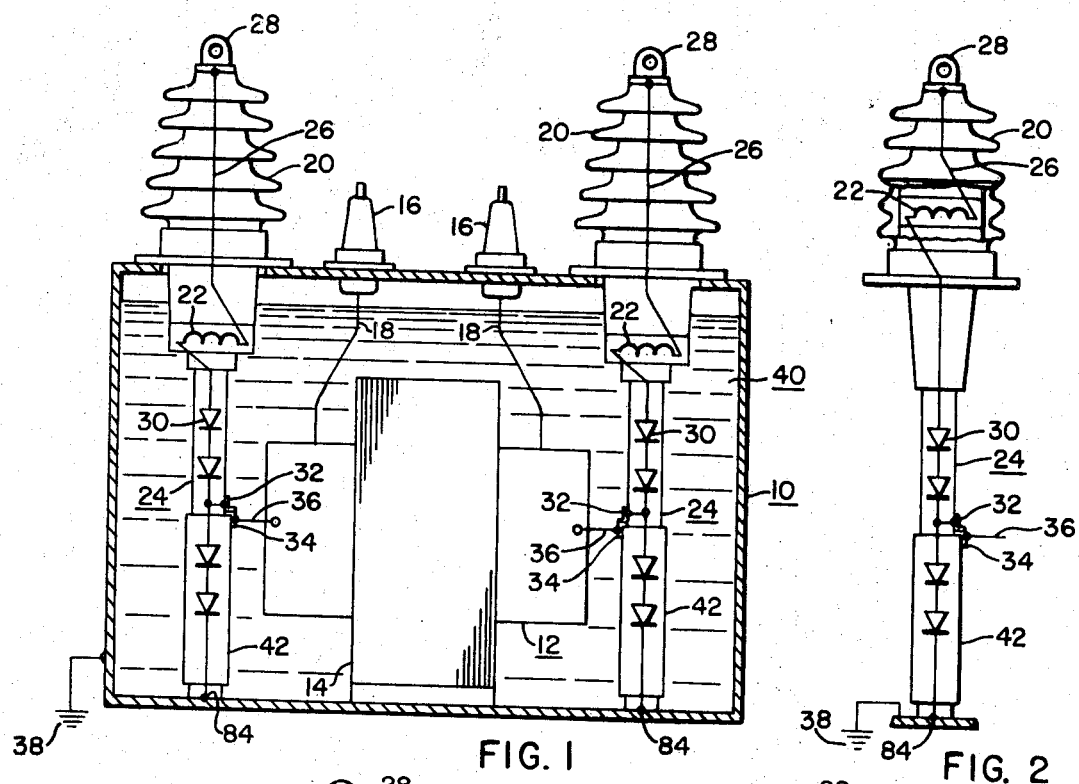
FIG. 1
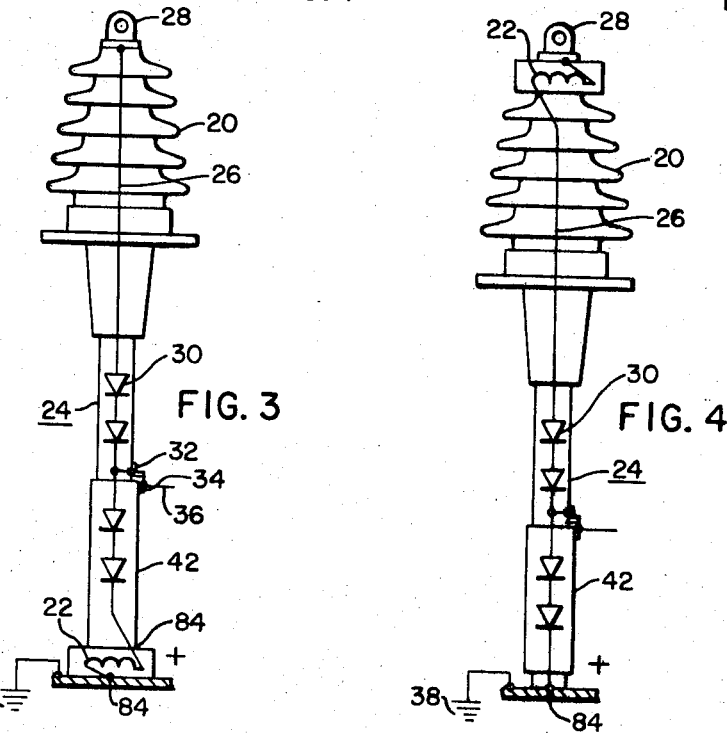
FIG. 2
FIG. 3
FIG. 4
WITNESSES
Helen M. Farkas
James F. Young
INVENTOR
Merrill G. Leonard
BY
F. E. Browder
ATTORNEY Feb. 16, 1971 M. G. LEONARD 3,564,386
POWER SUPPLY FOR CONVERTING HIGH VOLTAGE ALTERNATING
CURRENT INTO HIGH VOLTAGE DIRECT CURRENT
Filed Dec. 27, 1968 2 Sheets-Sheet 2

United States Patent Office 3,564,386
Patented Feb. 16, 1971

3,564,386
POWER SUPPLY FOR CONVERTING HIGH VOLTAGE ALTERNATING CURRENT INTO HIGH VOLTAGE DIRECT CURRENT
Merrill G. Leonard, Fowler, Ohio, assignor to Westinghouse Electric Corporation, Pittsburgh, Pa., a corporation of Pennsylvania
Filed Dec. 27, 1968, Ser. No. 787,346
Int. Cl. H01b 17/00; H02m 7/00
U.S. Cl. 321—8    10 Claims

ABSTRACT OF THE DISCLOSURE

A power supply for converting high voltage alternating current into high voltage direct current comprising a tank having a transformer therein. Bushings extending through the tank for connecting a power source to the transformer. High voltage bushings extending through the tank for connecting a direct current load to the power supply. Each of the high voltage bushings has attached thereto a terminal for connecting to a load, a choke coil, and a rectifier stack. The rectifier stacks extend into the tank and alternating current connections from the transformer and direct current connections to the lower end of the rectifier stacks are automatically made when the rectifier stacks are inserted into the tank.

BACKGROUND OF THE INVENTION

(1) Field of the invention

This invention relates to a power supply for converting high voltage alternating current to high voltage direct current and more particularly to a high voltage direct current power supply for electrostatic air cleaners, or like apparatus requiring a source of high voltage direct current power.

(2) Description of the prior art

Power supplies for converting alternating current to direct current have been provided in the prior art by providing a transformer in its own tank and a separate rectifier in its own tank and connecting the two units with the necessary electrical circuits. This type of system is expensive to manufacture and requires a large amount of space for installation because of the large number of components. If the units are fluid cooled it requires a large amount of coolant for the two tanks. In these installations when a choke coil is used, the choke coil is normally separate from the transformer and the rectifier. Power supplies have been provided with a transformer, a rectifier and a choke coil all in the same tank, but, the components are not integrated as provided by this invention.

The U.S. Pat. 3,369,166 discloses rectifier stacks mounted inside the direct current bushings. These bushings and rectifier stacks have deficiencies for installations of the type for which the present invention is useful because the rectifier stacks are not immersed in the liquid dielectric and consequently would not be adequately cooled in installations where the present invention is useful. Furthermore, U.S. Pat. 3,369,166 does not teach how two rectifier stacks could be connected internally of the tank automatically during installation of the direct current bushings to provide a four leg bridge rectifier. The present invention overcomes the deficiencies of the prior art by providing a power supply for converting alternating current power to direct current power comprising a transformer and a four legged rectifier bridge all in the same tank and cooled with the same fluid dielectric.

In the present invention the high voltage direct current bushings extend through the wall of the tank which houses the transformer. Each of the direct current bushings has attached to its lower end a rectifier stack. This rectifier stack is made up of a plurality of semiconductor diodes connected in series circuit relationship. The rectifier stacks are connected in series with a choke coil and a terminal on the bushing for connecting to a load. The center of each rectifier stack is connected to one end of the high voltage coil of the transformer. The lower end of each rectifier stack is connected to ground potential with a spring biased electrical contact. This invention also includes a spring supported guide for guiding the rectifier stacks into position when the direct current bushings are installed so that the electrical contacts will be properly made inside the transformer casing. In this invention the direct current bushings, the choke coil and the rectifier stacks may be installed as a unit and all electrical connections inside the tank are automatically made during the installation, and the connections are opened when the unit is removed for repairs.

SUMMARY

This invention provides an improved unitary power supply for converting high voltage alternating current into high voltage direct current for use by apparatus such as electrostatic precipitators, or other apparatus requiring a high voltage direct current power supply. The power supply comprises a transformer having a high voltage and a low voltage winding located in a tank containing fluid dielectric. Low voltage bushings are provided for connecting the low voltage winding to a suitable low voltage power source. High voltage bushings are provided through the tank wall for connecting the high voltage direct current to a load. Each high voltage bushing has connected to the lower end thereof a rectifier stack and a choke coil connected in series circuit relationship. The rectifier stack and the choke coil are connected to terminals on the high voltage bushings for connecting to a load. The bushings, the choke coils and the rectifier stacks are adapted to be installed into the power supply as a single unit. A spring biased electrical contact is provided in the tank for connection to the lower end of each rectifier stack. A spring supported guide member surrounds each of the spring biased contacts for connecting to the lower end of the rectifier stacks. Each of the rectifier stacks includes a connection connected to the approximate center of the rectifier stack. Each of the guide members carries an electrical contact which is electrically connected to one end of the high voltage winding of the transformer. As the high voltage DC bushings are installed in the tank, the guide member guides the rectifier stacks in position so that the lower end of the rectifier stacks makes proper electrical connection with the spring biased contacts and the contact connected to the center of the rectifier stack makes proper contact with the contact carried by the guide members to connect the center of the rectifier stacks to the ends of the high voltage winding of the transformer. This arrangement provides a four legged bridge rectifier. Switching means are also provided at the terminals of the high voltage direct current bushings for connecting the terminals to provide either half wave direct current power from the terminals or full wave direct current from the terminals, as required by the loads.

DESCRIPTION OF THE DRAWINGS

FIG. 1 is a sectional view illustrating a power supply as provided by this invention;

FIG. 2 is a sectional view showing an alternate location for the choke coils shown in FIG. 1;

FIG. 3 is a sectional view illustrating another location for the choke coils shown in FIG. 1;

FIG. 4 is a sectional view illustrating another location of the choke coils shown in FIG. 1;

DESCRIPTION OF THE PREFERRED EMBODIMENTS

Figure 5:
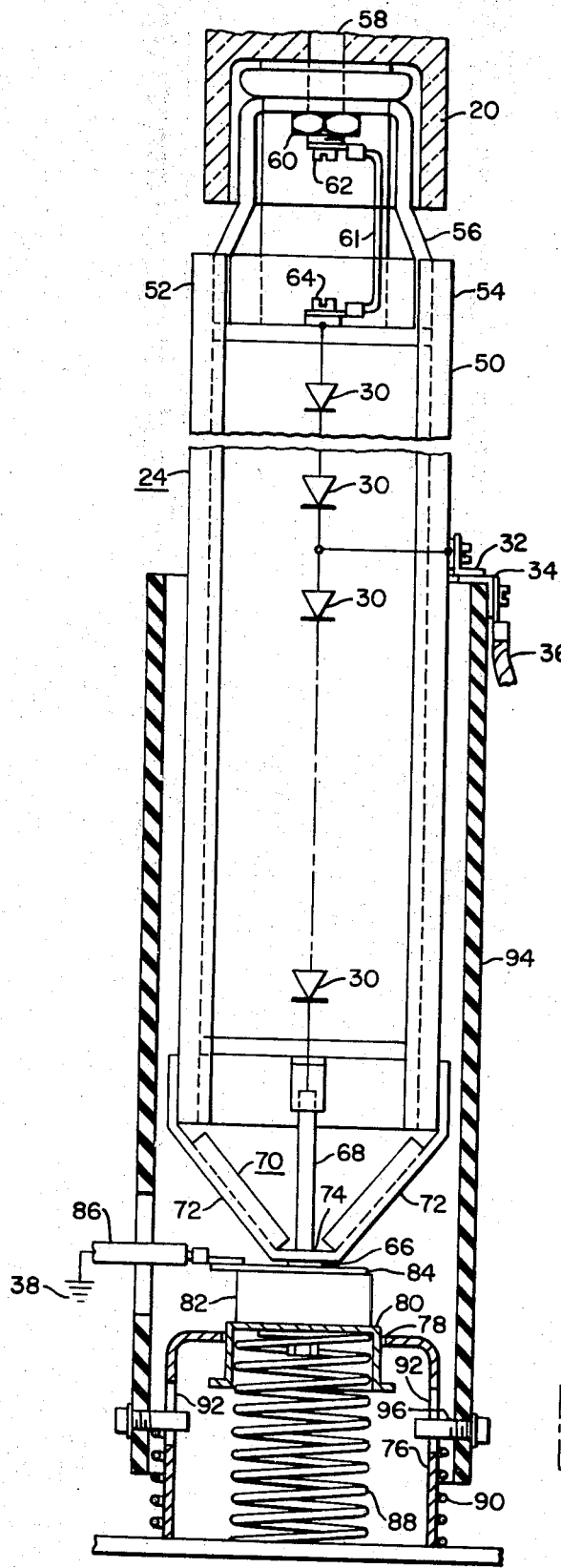
FIG. 5 is a sectional view showing details of the electrical contacts made inside the transformer casing to the rectifier stacks.

Throughout the description which follows like reference characters indicate like elements in the various figures of the drawings.

Referring specifically to FIG. 1 of the drawing, which shows in cross section a power supply for converting high voltage alternating current to high voltage direct current for use by electrostatic precipitators, or other electrical apparatus which requires a high voltage direct current power supply. The power supply shown in FIG. 1 comprises a casing or tank 10. The casing or tank 10 has positioned therein a transformer comprising a coil 12 having high and low voltage windings and a magnetic core 14 associated with the coil 12. A pair of low voltage bushings 16 are provided for conducting low voltage windings 18 through the top wall of the tank 10 to be conducted to the low voltage windings of the transformer coil 12.

A pair of high voltage direct current bushings 20 also extends through the top wall of the transformer casing 10. Each of the high voltage bushings 20 has connected to its lower end a choke coil 22 and a rectifier stack 24. The choke coil and the rectifier stack 24 are connected in series circuit relationship and they are connected by means of a conductor 26 to a terminal 28 on top of each of the bushings 20. A load circuit for utilizing the direct current power may be connected to the terminals 28 of the bushings 20.

Each of the rectifier stacks 24 comprises a plurality of semiconductor diodes 30 connected in series circuit relationship. The diodes 30 are mounted on a rack, which rack is attached as a unit to the bushing 20. As seen from FIG. 1 each of the rectifier stacks 24 has an electrical contact 32 near its center thereof. The contacts 32 are connected by means of a contact 34 and conductor 36 to one end of the high voltage winding of the transformer coil 12. The lower, or positive end, of each of the rectifier stacks 24 is connected to the bottom wall of the transformer casing 10, which is connected to ground potential as indicated at 38. The casing 10 is filled with a fluid dielectric 40 which completely covers the transformer, the rectifier stacks 24 and the choke coils 22. In the apparatus shown in FIG. 1 each assembly comprising an insulator 20, terminal 28, choke coil 22 and rectifier stack 24 is mounted as a unit on the transformer tank 10, and as the unit is inserted into the tank a guide member 42 guides the rectifier stacks 24 into position so that proper electrical contact will be made at the lower end of the stacks 24 and between the contact members 32 and 34.

Dielectric material 40 completely covers the transformer 12 and the rectifier stacks 24 and the choke coils 22. This provides proper cooling of the power supply, since substantial heat is generated by the semiconductor diodes in the rectifier stacks 24.

In the embodiment shown in FIG. 1 the choke coils 22 may be manufactured as separate units and then attached to the ends of the bushings 20.

FIG. 2 illustrates an assembly comprising a bushing 20 having a terminal 28, a choke coil 22 and a rectifier stack 24, similar to the assembly shown in FIG. 1; however, in FIG. 2 the choke coil 22 is mounted inside the insulator 20.

FIG. 3 illustrates an assembly comprising an insulator 20 having terminal 28 and a rectifier stack 24 and choke coil 22 with the choke coil located at the bottom rectifier stack 24. In this type of installation the choke coil would be separate from the rectifier stack 24 and would be permanently mounted inside the transformer casing 10 on the bottom wall thereof.

FIG. 4 illustrates an arrangement for a bushing 20 having a terminal 28, with the choke coil 22 mounted on top of the bushing 20 exteriorly of the transformer tank 10.

Referring to FIG. 5, this figure illustrates in detail a rectifier stack assembly 24 and the electrical contacts 32 and 34 at the center of the stack 24 and the lower contact to the rectifier stack 24. The rectifier stacks 24 each comprises a plurality of semiconductor diodes 30 connected in series circuit relationship. The diodes 30 are mounted on a rack member 50 which comprises a U-shaped pan having sides 52 and 54. A U-shaped bracket 56 is attached to the sides 52 and 54 of the pan 50 by welding on by some other suitable means. This bracket 56 is attached to the terminal 28 of the bushing by means of a stud 58 and a nut 60. Electrical contact is made from a stud 58 to the end of the rectifier stack by means of a jumper 61 attached to the stud by a screw 62 and to the ends of the rectifier stack 24 by a screw 64.

The lower end of each rectifier stack 24 is connected to a contact member 66 by means of an electrical connector 68 which electrical connector 68 makes electrical connection to the lower end of the rectifier stack 24 comprising the string of diodes 30. A guiding structure 70 comprising a pair of angle members 72, connected by a horizontal member 74, is provided at the lower end of the rack 50. The purpose of this guiding structure 70 will be explained hereinafter.

A lower contact structure is provided for connecting the lower contacts 66 of the rectifier stacks 24 to ground potential. This lower contact structure is mounted on the bottom wall of the transformer tank 10 and comprises a first inverted cup shape member 76 having an opening 78 in the top thereof. Another inverted cup shaped member 80 is positioned in the opening 78 in the cup shaped member 76 and the cup shaped member 80 has attached thereto a member 82 which carries a contact element 84 for engaging the contact 66 on the lower end of the rectifier stacks 24. An electrical lead 86 is electrically connected to the contact 84 and this lead may provide means for connecting a meter to measure the current flowing in the rectifier stacks 24 and it also serves to connect the contact 84 to ground potential such as indicated at 38. The cup shaped member 80 is biased upwardly by means of a spring 88 that maintains good electrical contact at all times between the contact member 84 and the lower contact member 66 on the rectifier stacks 24.

The inverted cup shaped member 76 is surrounded by a coil spring 90. The cup shaped member 76 is also provided with a pair of longitudinal slots 92. A cylindrical guide member 94 of insulating material surrounds the cup shaped member 76 and is provided with a pair of studs 96 which extend into the openings 92 in the cup shaped member 76. The studs 96 rest on the spring 90 so that the guide member 94 floats on the spring 90. The guide member 94 also has mounted thereon the electrical contact 34 which is engaged by the electrical contact 32 which connects to the center of the diode stacks 24 when a diode stack 24 is placed into position in the guide member 94. The floating mount of the guide member 94 permits the member 94 to guide the rectifier stacks 24 into proper position, even if there is some slight misalignment when the rectifier stacks are inserted into the top of the transformer casing 10. The angle members 72 of the structure 70 at the lower end of the rectifier stacks 24 permits easy starting of the rectifier stacks 24 into the upper end of the guide member 94. Once the angle members 72 have been started into the upper end of the guide member 94, because of the spring mounting of the guide member 94, the guide member 94 will adjust slightly to permit the rectifier stacks 24 to slide down into the guide member 24 and insure that the contact 66 of the rectifier assembly makes proper contact with the lower spring biased contact member 84. The spring biased contact 84 permits adjustment of the contact 84 so that the weight of a rectifier stack 24 and a bushing 20 thereon will insure that proper contact is made by gravity between the contact member 32, connected to the center of a rectifier stack 24, and the contact member 34 which is connected to one end of the high voltage winding of the transformer 12.

Figure 6:
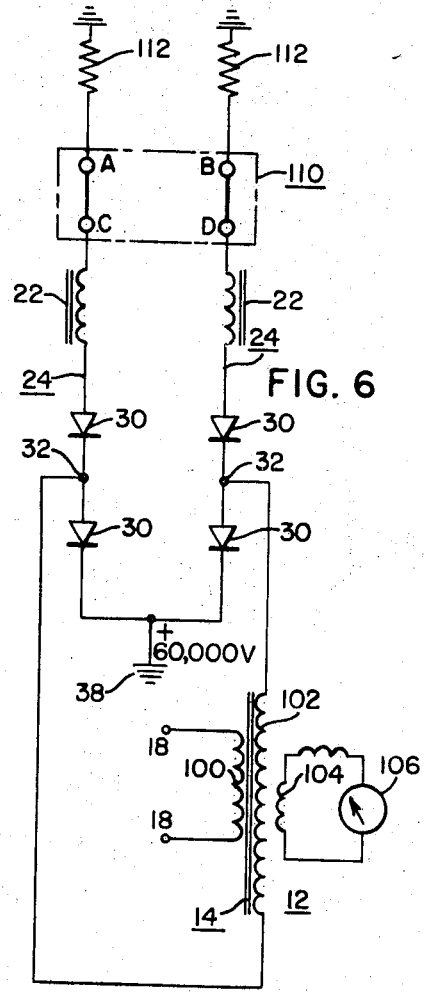
FIG. 6 is a schematic circuit diagram of the power supply provided by this invention.

Referring to FIG. 6, which shows a schematic diagram for the power supply provided by this invention, the transformer 12 is illustrated as comprising a core 14 having a low voltage winding 100 thereon and a high voltage winding 102 thereon. An auxiliary winding 104 is inductively connected to the center of the high voltage winding to energize a vacuum tube voltmeter 106 for measuring the high voltage output of the transformer 12. The winding 104 is connected near the center of the high voltage winding 102 because this is the point of highest flux density and lowest flux leakage; and, therefore will give the most accurate measurement of the high voltage output of the transformer 12. The lower end of the rectifier stacks 24 are indicated as being connected to ground at 38. Each end of the high voltage winding 102 is connected to an approximately midpoint 32 of one of the rectifier stacks 24. The rectifier stacks 24 are each connected in series with a choke coil 22. The choke coils 22 are connected to the terminals on the bushings 20. A switching arrangement which is indicated schematically as 110 is connected to the terminals 28 of the bushings 20.

The switching arrangement 110 has four terminals indicated as A, B, C, and D. A load 112 has been indicated as connected between the terminals A and B and ground. The load which has been indicated at 112 may be the ionizer or the plates of an electrostatic air cleaner.

With the terminals of the switching arrangement 110 connected as shown in FIG. 6 a half wave direct current potential is obtained from each of the terminals A and B.

Figures 7, 8:
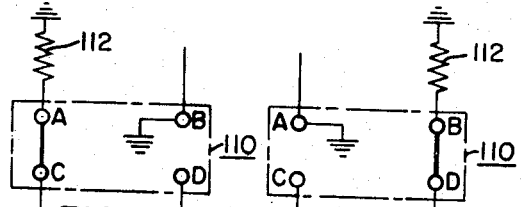
FIG. 7 is a schematic diagram illustrating switch connections to the terminals of the power supply of FIG. 1 to obtain half wave direct current from one of the bushing terminals.
FIG. 8 is a schematic switching connection for obtaining half wave direct current from another of the bushing terminals of FIG. 1.

FIG. 7 illustrates an alternate method of switching connecting for the terminals B and D. This arrangement provides a half wave alternating current potential at the terminal A and the terminal B is connected to ground.

FIG. 8 illustrates another alternate way of connecting the terminals of the switching arrangement 110 so that a half wave direct current potential is obtained from the terminal B, and the terminal A is connected to ground potential.

Figures 9, 10:
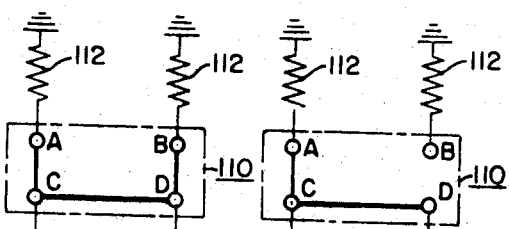
FIG. 9 is a schematic switching arrangement for obtaining full wave direct current from both of the terminal bushings of the power supply of FIG. 1; and, FIG. 10 is a schematic switching arrangement for obtaining full wave direct current power from only one of the bushing terminals of FIG. 1.

FIG. 9 illustrates an alternate switching arrangement for connecting the terminals by connecting terminals AC, CD and DB together. This arrangement provides a full wave direct current potential at each of the terminals A and B.

FIG. 10 illustrates an alternate way of connecting the terminals A, C and D so that a full wave direct current potential may be obtained from the terminal A.

It is anticipated that there will be installations in which the terminal connections illustrated in FIGS. 6, 7, 8, 9 and 10 will be useful to provide a desired direct current potential output.

Referring to FIG. 6 it is seen that each of the rectifier stacks 24 provides two legs of a bridge rectifier. The bottom or positive ends of the rectifier bridge is connected to ground potential at 38 and the output terminals C and D are connected to the switching arrangement 110. In power supplies of this type the voltage desired at the output terminals C and D will be in the order of 60,000 volts. The potential at the terminals C and D will be negative direct current potential, since the positive end of the rectifier bridge is grounded at 38. Potentials of this order of magnitude are frequently used in air cleaners of the electrostatic type.

From the foregoing descriptions, taken in connection with the drawings, it is seen that this invention has provided an improved high voltage power supply comprising a plurality of rectifier stacks which comprise a minimum of parts, which is easy to assemble and service, and which is versatile in providing output potentials of a varied number of types.

What I claim is:

1. A power supply comprising, a tank, a coil in said tank, circuit means for connecting an alternating current power source to said coil, a bushing having a terminal at its upper end for connecting to a load and a rectifier stack attached to its lower end, said rectifier stack being electrically connected to said terminal on said bushing, said bushing being mounted on said tank with said rectifier stack extending downwardly into said tank, electrical contact means engaging the lower end of said rectifier stack when said bushing is mounted in said tank, and contact means at a point intermediate the ends of said rectifier stack for engaging contact means connected to said coil for connecting said rectifier stack in circuit relationship with said coil when said bushing is mounted on said tank.

2. The apparatus of claim 1 wherein a choke coil is connected in series circuit relationship with said terminal on said bushing, said rectifier stack and said electrical contact means connected to the lower end of said rectifier stack.

3. The apparatus of claim 1 wherein the electrical contact means connected to the lower end of the rectifier stack comprises a spring biased contact element.

4. The apparatus of claim 1 including spring supported guide means for said rectifier stack.

5. The apparatus of claim 4 wherein said guide means is hollow and surrounds said contact means connected to the lower end of said rectifier stack and surrounds the lower end of said rectifier stack.

6. The apparatus of claim 4 wherein said rectifier stack has contact means intermediate the ends of said stack, and said guide means has contact means which engage said contact means intermediate the ends of said stack to connect said rectifier stack in circuit relationship with said coil.

7. The apparatus of claim 4 wherein said rectifier stack has contact means at the middle point between its ends, and said guide means has contact means which engage said contact means at the middle point between the ends of said rectifier stack to connect said rectifier stack in circuit relationship with said coil.

8. The apparatus of claim 1 wherein said rectifier stack comprises a plurality of diodes connected in a series circuit string, with the negative terminal of said series circuit string connected to said terminal on said bushing and the positive terminal of said series circuit string connected to ground potential by the contact means connected to the lower end of said rectifier stack.

9. A power supply comprising, a tank, fluid dielectric in said tank, a coil comprising a low voltage winding and a high voltage winding in said tank, circuit means for connecting an alternating current power source to the low voltage winding of said coil, a pair of high voltage bushings extending through the wall of said tank, each of said high voltage bushings having a terminal at its upper end for connecting to a load and a rectifier stack attached to its lower end, said rectifier stacks being electrically connected to the respective terminal on said bushings, said bushings being mounted on said tank with said rectifier stacks extending downwardly into said tank so that said rectifier stacks are immersed in said fluid dielectric in said tank, electrical contact means connecting the lower end of each of said rectifier stacks to ground potential, electrical contact means connecting said high voltage winding to a midpoint on each of said rectifier stacks, said rectifier stacks providing a bridge rectifier which delivers direct current potential to the terminals of said bushings.

10. The apparatus of claim 9 wherein said rectifier stack comprises a plurality of diodes connected in series circuit relationship.

References Cited

UNITED STATES PATENTS

| 1,905,629 | 4/1933 | Corbitt | 321—8CUX |
| 1,959,513 | 5/1934 | Weyandt | 321—8CUX |
| 2,444,458 | 7/1948 | Master | 321—8 |
| 2,734,178 | 2/1956 | Dolamore | 339—188X |
| 2,802,999 | 8/1957 | Anderson | 339—188 |
| 2,937,359 | 5/1960 | Cronin et al. | 339—36 |
| 3,234,451 | 2/1966 | Diebold | 317—100X |
| 3,369,166 | 2/1968 | Lake | 321—8 |

FOREIGN PATENTS

| 117,400 | 4/1930 | Austria | 174—75FUX |
| 403,063 | 6/1966 | Switzerland | 321—8 |

WILLIAM H. BEHA, Jr., Primary Examiner

U.S. Cl. X.R.

174—15, 139; 317—100